US012699258B2

(12) United States Patent

Shechtman et al.

(10) Patent No.: US 12,699,258 B2

(45) Date of Patent: Aug. 4, 2026

(54) LENS SYSTEM FOR WAVEFRONT MODULATION

(71) Applicant: Technion Research & Development Foundation Limited, Haifa (IL)

(72) Inventors: Yoav Shechtman, Haifa (IL); Boris Ferdman, Haifa (IL); Nadav Opatovski, Haifa (IL); Elias Nehme, Haifa (IL); Reut Kedem, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 203 days.

(21) Appl. No.: 18/567,431

(22) PCT Filed: Jun. 6, 2022

(86) PCT No.: PCT/IL2022/050601

§ 371 (c)(1),
(2) Date: Dec. 6, 2023

(87) PCT Pub. No.: WO2022/259243

PCT Pub. Date: Dec. 15, 2022

(65) Prior Publication Data

US 2024/0272411 A1 Aug. 15, 2024

Related U.S. Application Data

(60) Provisional application No. 63/197,416, filed on Jun. 6, 2021.

(51) Int. Cl.
G02B 21/02 (2006.01)
G02B 21/36 (2006.01)

(52) U.S. Cl.
CPC ......... G02B 21/025 (2013.01); G02B 21/361 (2013.01); G02B 21/362 (2013.01)

(58) Field of Classification Search
CPC ... G02B 21/025; G02B 21/361; G02B 21/362
USPC .......................................................... 359/368
See application file for complete search history.

(56) References Cited

U.S. PATENT DOCUMENTS

| | | | | |
|---|---|---|---|---|
| 10,955,331 | B2 | 3/2021 | Piestun et al. | |
| 2005/0046865 | A1* | 3/2005 | Brock ................ | G01B 9/02083 |
| | | | | 356/495 |
| 2005/0052754 | A1* | 3/2005 | Quake ................ | G02B 21/0008 |
| | | | | 359/664 |

(Continued)

FOREIGN PATENT DOCUMENTS

WO WO 2022/259243 12/2022

OTHER PUBLICATIONS

Murphy Douglas B. et al: "Molecular Expressions Microscopy Primer: Specialized Microscopy Techniques—DIC Microscope Configuration and Alignment", Nov. 13, 2015 (Nov. 13, 2015), pp. 1-13.*
Supplementary European Search Report and the European Search Opinion Dated Mar. 18, 2025 From the European Patent Office Re. Application No. 22819761.2. (10 Pages).
Douglas et al. "Molecular Expressions Microscopy Primer: Specialized Microscopy Techniques—DIC Microscope Configuration and Alignment", 1-13 pages, Nov. 13, 2015.

(Continued)

*Primary Examiner* — Sharrief I Broome

(57) ABSTRACT

An objective lens system comprises a set of lenses, arranged along a common optical axis to form a back focal plane. The objective lens system is a component in a microscope. The objective lens system also comprises an optical mask at the back focal plane, and a housing encapsulating the set of lenses and the optical mask.

18 Claims, 7 Drawing Sheets

(56) References Cited

U.S. PATENT DOCUMENTS

| 2010/0278400 | A1* | 11/2010 | Piestun | G02B 21/0076 |
| | | | | 359/368 |
| 2013/0324858 | A1* | 12/2013 | Xu | A61B 5/0068 |
| | | | | 600/478 |
| 2015/0077842 | A1* | 3/2015 | Kleppe | G02B 21/0072 |
| | | | | 359/380 |
| 2016/0062100 | A1* | 3/2016 | Cohen | G02B 3/0006 |
| | | | | 348/79 |
| 2016/0131900 | A1 | 5/2016 | Pretorius | |
| 2016/0231553 | A1* | 8/2016 | Piestun | G02B 21/367 |
| 2018/0284417 | A1* | 10/2018 | Deisseroth | G02B 21/0012 |
| 2019/0162647 | A1* | 5/2019 | Unlu | G02B 27/52 |
| 2019/0246092 | A1* | 8/2019 | Shechtman | H04N 13/218 |
| 2020/0379231 | A1 | 12/2020 | Dohi | |
| 2021/0096056 | A1* | 4/2021 | Weiss | G06T 7/70 |
| 2024/0272411 | A1* | 8/2024 | Shechtman | G02B 21/362 |

OTHER PUBLICATIONS

Shribak et al. "Mapping Optical Path Length and Image Enhancement Using Quantitative Orientation-independent Differential Interference Contrast Microscopy", Journal of Biomedical Optics, vol. 22, Issue 1, 016006, Jan. 2017.

International Preliminary Report on Patentability Dated Dec. 21, 2023 From the International Bureau of WIPO Re. Application No. PCT/IL2022/050601. (15 Pages).

International Search Report and the Written Opinion Dated Sep. 11, 2022 From the International Searching Authority Re. Application No. PCT/IL2022/050601. (15 Pages).

Communication Pursuant to Article 94(3) EPC Dated Mar. 13, 2026 From the European Patent Office Re. Application No. 22819761.2 (6 Pages).

* cited by examiner

FIG. 1A
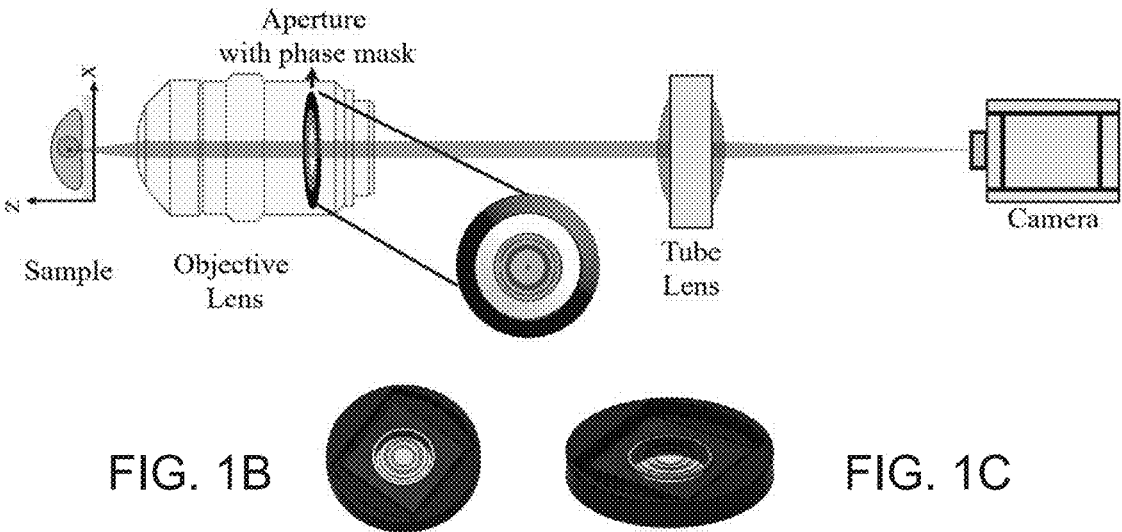
FIG. 1B            FIG. 1C
FIG. 2A
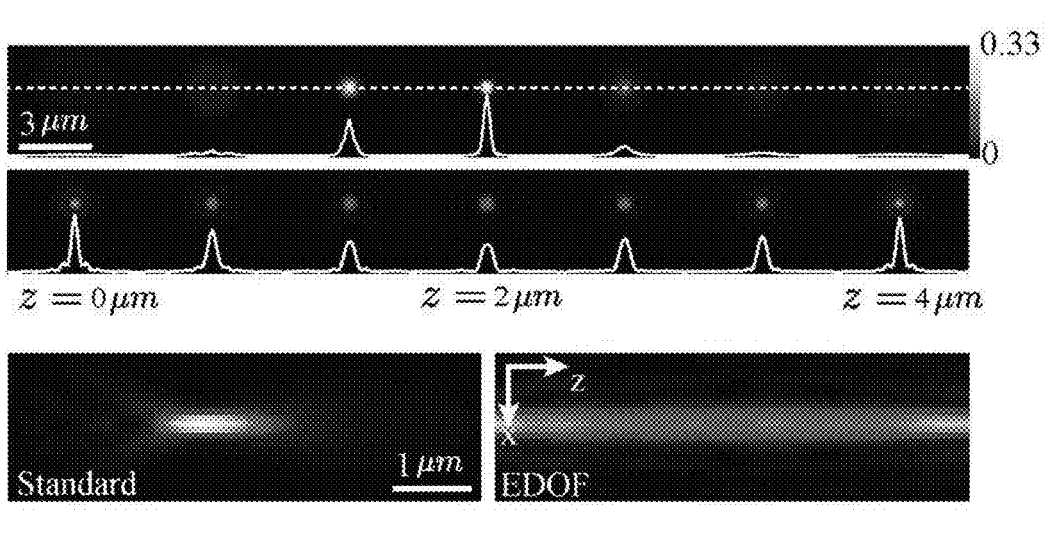
FIG. 2B            FIG. 2C z = 0 mm          z = 0.5 mm          z = 1 mm          z = 1.5 mm          scan direction z = 0 mm          z = 0.5 mm          z = 1 mm          z = 1.5 mm          scan direction z = 0 mm          z = 0.5 mm          z = 1 mm          z = 1.5 mm          scan direction z = 0 mm          z = 0.5 mm          z = 1 mm          z = 1.5 mm          scan direction $z = 8 \mu m$
NA=0.75, M=20

$z = 1.5 mm$
NA=0.13, M=4

$z = 4 \mu m$
NA=1.49, M=100

$z = 4 \mu m$
NA=1.49, M=100

Imaged sample

EDOF
$z = 0.65 mm$ standard
$z = 0 mm$ standard
$z = 0.65 mm$ standard
$z = 1 mm$

LENS SYSTEM FOR WAVEFRONT MODULATION

RELATED APPLICATION APPLICATIONS

This application is a National Phase of PCT Patent Application No. PCT/IL2022/050601 having International filing date of Jun. 6, 2022, which claims the benefit of priority under 35 USC § 119(e) of U.S. Provisional Patent Application No. 63/197,416 filed on Jun. 6, 2021. The contents of the above applications are all incorporated by reference as if fully set forth herein in their entirety.

FIELD AND BACKGROUND OF THE INVENTION

The present invention, in some embodiments thereof, relates to optics and, more particularly, but not exclusively, to a lens system for wavefront modulation, particularly useful for computational imaging.

Microscopic imaging techniques can be broadly classified into two categories: those that are direct-image forming, wherein the image formed on the sensor directly corresponds with the imaged object, and those that rely on computational imaging to reconstruct an image of the object. As a representative example, computational imaging is oftentimes used to accurately localize biomolecules in order to study the structure and dynamics of sub-cellular processes. Acquisition of 3D information is conventionally achieved by scanning in the axial direction or by modifying the optical path with elements that modulate the Point Spread Function (PSF), such as phase or amplitude masks.

Various PSF modulating techniques add 4f optical processing systems to a conventional microscope, such that their back focal plane is conjugate to the objective lens' aperture. These systems contain at least two long focal length lenses and a phase or amplitude mask, that modify the PSF of the imaging system to encode the desired information about the emitter, correct for optical aberrations, or extend the depth of field.

U.S. Pat. No. 10,955,331 discloses a method for estimating the position and/or angular orientation of a particle is disclosed. An excitation beam is direct through a lens of the optical system to a medium containing a particle. A radiation pattern emitted by the particle in response to the excitation beam is directing by the optical system to a signal processing unit that includes two optical channels. An engineered aberration is introduced into each optical channel, and the radiation pattern is imaged using each of the channel, such that the position or an angular orientation of the particle within the medium is encoded in a combination of the two images.

U.S. Published Application No. 20190246092 discloses a phase mask that is placed between the objective lens and the tube lens of a microscope, and that modifies a shape of light passed from an object so as to characterize the light as having two lobes. The lateral distance between the lobes changes along a line as a function of an axial proximity of the object to a focal plane, and with another line depending on whether the object is above or below the focal plane. A three-dimensional image is generated from the light by using the modified shape.

SUMMARY OF THE INVENTION

According to an aspect of some embodiments of the present invention there is provided an objective lens system.

The objective lens system comprises: a set of lenses, arranged along a common optical axis to form a back focal plane; an optical mask at the back focal plane; and a housing encapsulating the set of lenses and the optical mask.

Due to the fact the illumination path is also going through the objective it is possible to also modulate the illumination by the phase mask placed in the objective.

According to some embodiments of the invention the optical mask is selected to encode depth information in an optical beam received from an object.

According to some embodiments of the invention the optical mask is selected to encode spectral information in an optical beam received from an object.

According to some embodiments of the invention the optical mask is selected to encode orientation information in an optical beam received from an object.

According to some embodiments of the invention the optical mask is selected to extend a characteristic depth of field (DOF) of the set of lenses.

According to some embodiments of the invention the objective lens system is a component in a microscope and is characterized by a depth of field of $$X \cdot \lambda \cdot \frac{n}{NA^2},$$

where $\lambda$ is the wavelength, n is the medium's refractive index and NA is the objective numerical aperture, and X is at least 2, more preferably at least 3, more preferably at least 4, more preferably at least 5, more preferably at least 6, more preferably at least 7, more preferably at least 8, more preferably at least 9, more preferably at least 10.

According to some embodiments of the invention the optical mask is selected to introduce optical aberrations to an optical beam passing therethrough.

According to some embodiments of the invention the optical mask is a phase mask.

According to some embodiments of the invention the optical mask is an amplitude mask.

According to some embodiments of the invention the optical mask is a phase-amplitude mask.

According to some embodiments of the invention the system comprises a removable ring holder, wherein the optical mask is mounted on the removable ring holder.

According to some embodiments of the invention the objective lens system is characterized by a numerical aperture of at least 0.1 for air objectives and at least 1.33 for oil/liquid immersed objectives.

According to some embodiments of the invention the set of lenses provides magnification of from about 4× to about 500× or from about 4× to about 100×.

According to an aspect of some embodiments of the present invention there is provided a kit. The kit comprises a plurality of objective lens systems, wherein each objective lens system comprises the system as delineated above and optionally and preferably as further detailed below, and wherein at least two of the objective lens systems have different optical masks.

According to an aspect of some embodiments of the present invention there is provided a method of imaging an object. The method comprises: selecting from the kit an objective lens system based on at least one property of the object; mounting the selected objective lens system on a microscope having an imaging system; imaging the object using the imaging system; and processing image data received from the imaging system to provide an image of the object.

According to some embodiments of the invention at least one property is selected from the group consisting of size, brightness, optical environment.

According to some embodiments of the invention the microscope is devoid of an active optical mask at a Fourier plane thereof.

According to some embodiments of the invention the microscope is devoid of any optical mask aside for the optical mask at the objective lens system.

According to an aspect of some embodiments of the present invention there is provided a microscope system. The microscope system comprises an objective lens system, a tube lens system, and an imaging system, wherein the objective lens system comprises the system as delineated above and optionally and preferably as further detailed below.

According to some embodiments of the invention the microscope system is devoid of an active optical mask at a Fourier plane thereof.

According to some embodiments of the invention the microscope system is devoid of any optical mask aside for the optical mask at the objective lens system.

According to an aspect of some embodiments of the present invention there is provided a method of fabricating an objective lens system. The method comprises: mounting an optical mask on a ring holder; placing the ring holder at a back focal plane of a set of lenses arranged along a common optical axis; and adjusting alignment of the ring holder to ensure that an optical lens of the optical mask is collinear with the common optical axis of the set of lenses.

According to some embodiments of the invention the method comprises aligning the set of lenses along the common optical axis.

According to some embodiments of the invention the optical mask is aligned by far field imaging.

According to some embodiments of the invention the optical mask is aligned by applying point-source imaging to directly measure of a characteristic PSF of the objective lens system. This is optionally and preferably achieved by imaging fiduciary sub-diffraction sized particles that serve practically as point sources.

According to an aspect of some embodiments of the present invention there is provided an optical mask system. The optical mask system comprises a ring holder and an optical mask mounted on the ring holder. The optical mask is as delineated above and optionally and preferably as further detailed below. The ring holder is being removably connectable to a turret of a microscope in a manner that allows the turret to also receive, on top of the ring holder, an objective lens system having a set of lenses arranged along a common optical axis as delineated above and optionally and preferably as further detailed below.

According to an aspect of some embodiments of the present invention there is provided a kit, which comprises optical mask system and the objective lens system, wherein the set of lenses are arranged to form a back focal plane. Optionally, but not necessarily, when the front side is connected to the objective lens system, the optical mask is at the back focal plane.

According to an aspect of some embodiments of the present invention there is provided a microscope system. The microscope system comprises a turret mounted on a support member, and the optical mask system and the objective lens system as delineated above and optionally and preferably as further detailed below.

According to some embodiments of the invention the objective lens system is removably connectable also directly to the turret.

According to some embodiments of the invention the turret is rotatably mounted to a support member for retaining a plurality of optical mask systems to allow a selection of one of the optical mask systems by rotation of the turret.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the Drawings:

FIGS. 1A-C are schematic illustrations of an imaging system, according to some embodiments of the present invention. FIG. 1A illustrates an imaging process in which fluorescence emission from a biological sample is collected by an objective lens and passes through an aperture with an integrated and aligned optical mask, such as, but not limited to, a phase mask. The mask is designed to module a PSF into a desired 3D shape. The light is imaged by a tube lens onto a camera. FIGS. 1B and 1C illustrate a top (FIG. 1B) and a perspective (FIG. 1C) views of a mask mount design, with mask attached on top of a fabricated mask holder (black) with adhesive. The bounding chrome ring of the mask has a matched diameter as the mount and objective aperture.

FIGS. 2A-C show results experiments performed according to some embodiments of the present invention using a small-footprint EDOF mask for an oil immersed objective with M=100, NA=1.49. FIG. 2A shows slices of the unmodulated (top) and EDOF (bottom) PSFs. FIG. 2B-C show XZ cross-sections of the standard (FIG. 2B) and EDOF (FIG. 2C) PSFs. The color scale is normalized to the maximum intensity of the in-focus, unmodulated PSF.

FIG. 3A shows unmodulated airy pattern of the microscope, FIG. 3B shows a tetrapod 3D encoding PSF, FIG. 3C shows the pattern as modulated by EDOF PSF, and FIG. 3D demonstrates decrement of the NA of the microscope to obtain a larger DOF by placing an amplitude mask.

FIGS. 4A and 4B show EDOF designs for an air objective with a large aperture, and FIGS. 4C and 4D show EDOF and tetrapod masks for an oil-immersed objective (M=100, NA=1.49) using a mask diameter of about 5.2 mm.

FIG. 5A shows the imaged sample, FIG. 5B shows results of EDOF imaging with a phase contrast objective which was dismantled to replace the ring with an EDOF phase mask, and FIGS. 5C-E show unmodulated PSF (standard objective) snapshots at three different axial positions.

DESCRIPTION OF SPECIFIC EMBODIMENTS OF THE INVENTION

Figure 3A:
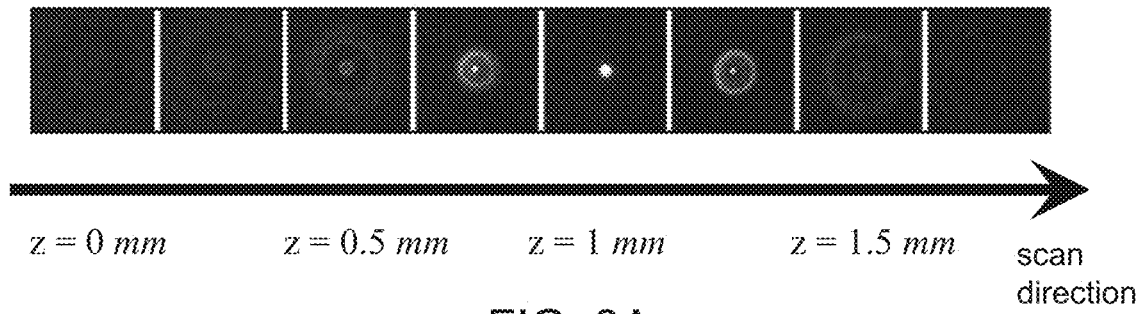
FIGS. 3A-D show results of experimental 3D PSF measurements, obtained in experiments performed according to some embodiments of the present invention. A phase contrast objective (M=4, NA=0.13) was dismantled and its ring was removed. Designed phase masks were placed and the resulting 3D PSF from a fluorescent microsphere adhered to a glass coverslip was measured via axial scanning using the microscope stage.
Figure 3B:
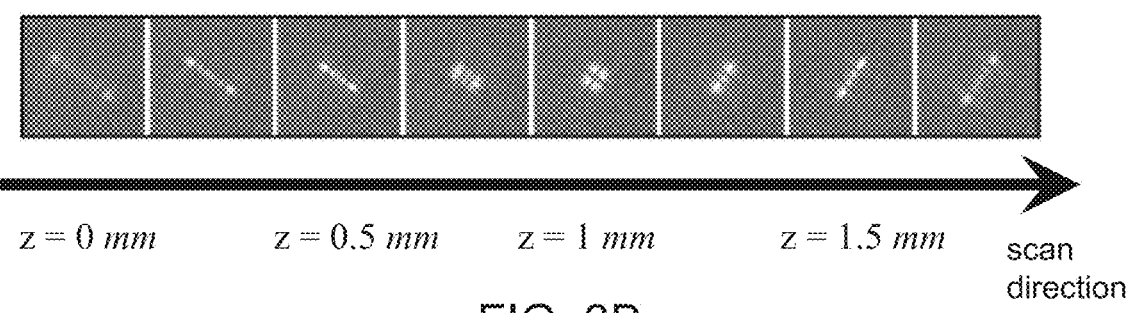
Figure 3C:
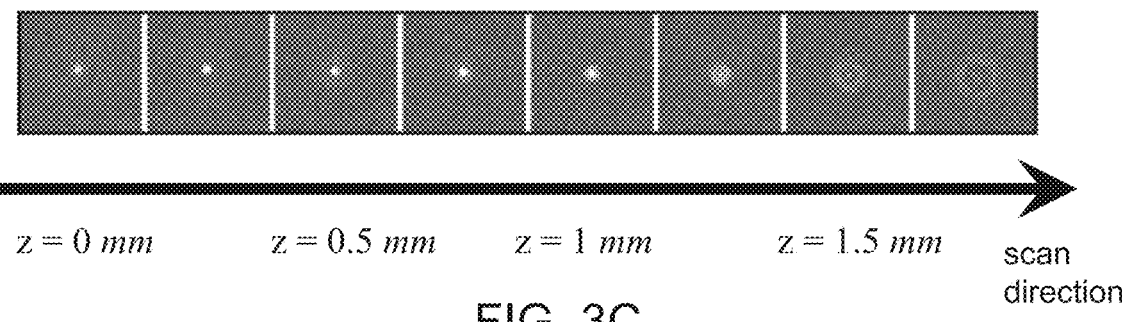
Figure 3D:
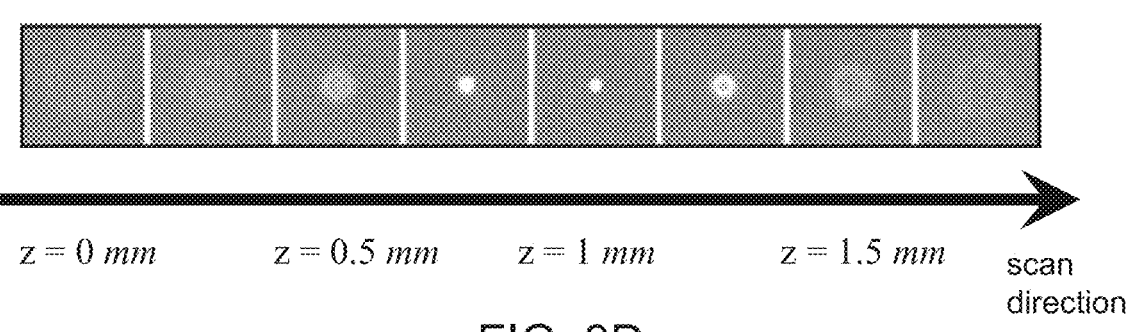

The present invention, in some embodiments thereof, relates to optics and, more particularly, but not exclusively, to a lens system for wavefront modulation, particularly useful for computational imaging.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Objective lenses are typically designed to have a flat wavefront with a clear aperture, in order to generate high quality images to the human eye. In the context of computational imaging, an imaging system can be modified to produce optically modified images that encode information that is not available in standard imaging systems, although such images may not appear of high quality to the human observer. Following the application of a computational algorithm, this information is extracted.

Traditional computation imaging techniques employ PSF engineering in which an optical phase and/or amplitude mask is placed in the Fourier plane of the microscope. The Inventors found that such a technique is cumbersome because it extends the imaging path by several optical components (typically two lenses and a phase mask), significantly increases the size and weight of the imaging system. Large systems are particularly problematic in applications in which mechanical scanning is required. The Inventors also found that the traditional techniques may also provide sub-optimal results, because the addition of these components degrades the performance of the microscope by introducing undesired losses and aberrations. An additional drawback of these systems is that the additional components are added or re-aligned in situ, oftentimes resulting in improper optical alignment.

Figure 6:
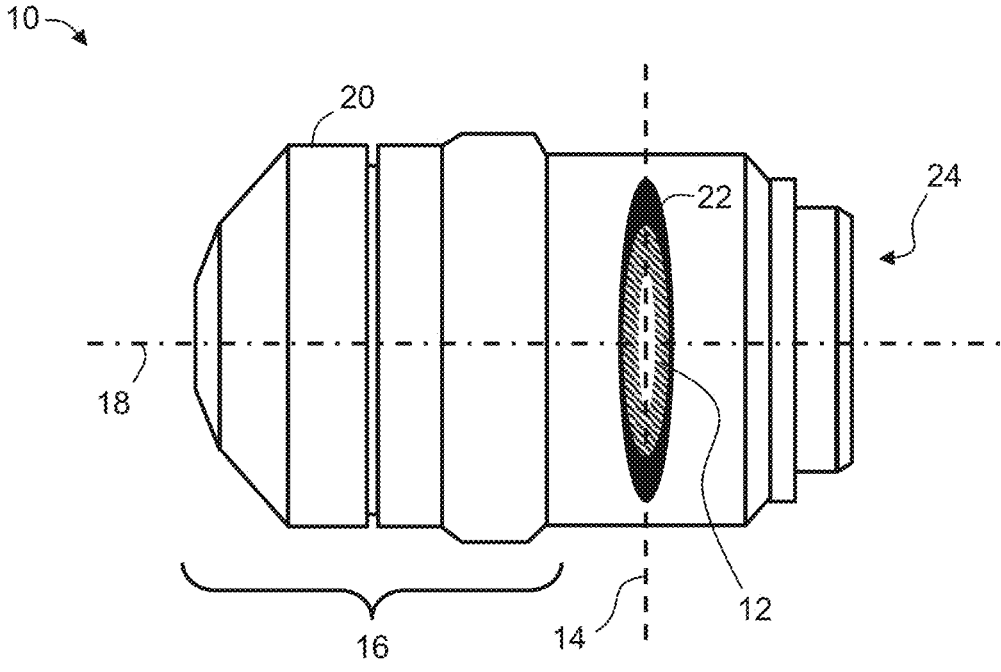
FIG. 6 is a schematic illustration of an objective lens system according to some embodiments of the present invention.

Referring now to the drawings, FIG. 6 is a schematic illustration of an objective lens system 10. The objective lens system 10 comprises an optical mask 12 at a back focal plane 14 of an objective lens arrangement 16. Optical mask 12 can be a phase mask, an amplitude mask, or phase-amplitude mask, as desired.

Objective lens arrangement 16 is typically in the form of a set of lenses, arranged along a common optical axis 18 to form back focal plane 14. System 10 also comprises a housing 20 which encapsulates together arrangement 16 and optical mask 12.

The objective lens system 10 of the present embodiments facilitates a simple imaging microscope, allowing to image a sample and perform experiments using a single objective lens, without the need to set up a cumbersome and expensive optical system.

Another advantage of the present embodiments is that the objective lens system 10 can, in some embodiments of the present invention, be especially manufactured for computational imaging, and so it does not need to produce a focused and high-quality human-interpretable image. This is an advantage because the stringent fabrication and optical correction constraints that are typically associated with a design and fabrication of conventional objective lenses may be relaxed. This allows more freedom in the design and fabrication, and optionally and preferably also reduces the production costs.

The total length of system 10 is preferably less than 15 cm or less than 12 cm or less than 10 cm. System 10 is optionally and preferably characterized by a numerical aperture of at least 0.05, more preferably at least 0.08, more preferably at least 0.1. objective lens arrangement 16 optionally and preferably provides magnification of from about 4× to about 500×.

Typically, optical mask 12 of system 10 is selected to introduce optical aberrations to an optical beam passing therethrough. Optical mask 12 can be of any type known in the art. In some embodiments of the present invention optical mask 12 is selected for computational imaging. Representative examples of optical masks suitable for computational imaging include, without limitation, an optical mask that encodes depth information in an optical beam received from an object, an optical mask that encodes spectral information in an optical beam received from an object, and an optical mask that encodes orientation information in an optical beam received from an object. In some embodiments of the present invention optical mask 12 is selected for enhanced depth of field imaging. For example, optical mask 12 can be selected to extend a characteristic depth of field (DOF) of objective lens arrangement 16. A representative but non-limiting example of an optical mask suitable for some embodiments of the invention is found in U.S. Published Application No. 20190246092, supra.

In some embodiments of the present invention the optical mask 12 of system 10 is application-specific. In these embodiments, the objective lens system 10, or, more preferably, the optical mask 12 incorporated into the objective lens system 10 is selected based on the application for which the microscope is intended to be used. Representative examples of applications for which the optical mask can be specific include, without limitation, volumetric imaging, extended depth-of-field imaging, localization microscopy over a predetermined axial range, and multi-spectral imaging. Preferably, a different optical mask is used for each of these applications.

In some embodiments of the present invention system 10 comprises a removable ring holder 22, optical mask 12 is mounted on removable ring holder 22. The advantage of these embodiments is that they allow mask 12 to be application-specific, without requiring objective lens arrangement 16 to be application-specific. Thus, these embodiments allow using the same objective lens arrangement 16 to be used for more than one application, where for each application different optical aberrations are introduced. When it is desired to switch between applications the removable ring holder 22 is used to replace the mask in system 10. The removable ring holder 22 can be configured for being mounted internally in housing 20, as illustrated in FIG. 6, or be located externally at the back side 24 of housing 20, as further detailed hereinunder with reference to FIGS. 9A and 9B.

Preferably, but not necessarily, optical mask 12 is glued onto ring holder 22 in a way that they cannot be disconnected without causing damage to mask 12 and/or holder 22. In these embodiments, optical mask 12 and ring holder 22 are provided as a single component that can be removably mounted to housing 12.

Thus, the present embodiments provide a kit, which comprises a plurality of objective lens systems, wherein each objective lens system comprises system 10 as further detailed hereinabove, and wherein at least two of objective lens system have different optical masks.

Alternatively, the kit can comprise a plurality of ring holders, wherein each ring holder comprises ring holders 22 as further detailed hereinabove, and wherein at least two of the ring holders have different optical masks.

Still alternatively, the kit can comprise a plurality of optical masks each being removable mountable on to ring holder 22.

Figure 7:
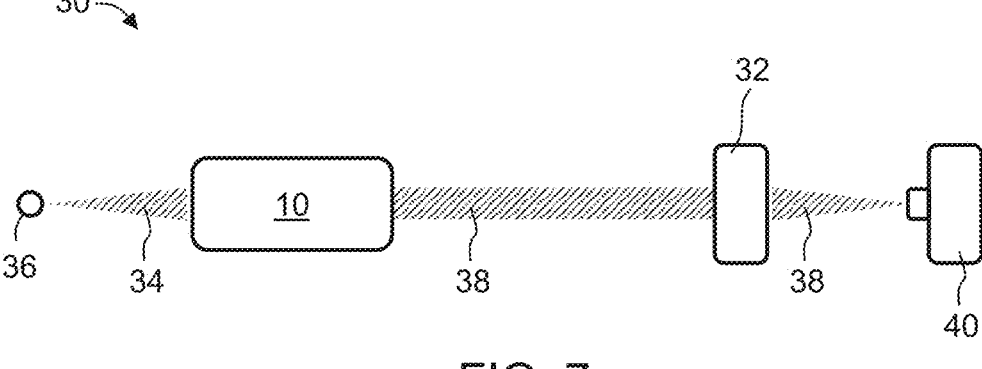
FIG. 7 is a schematic illustration showing a representative example of a microscope system incorporating the objective lens system according to some embodiments of the present invention.

System 10 can be a component of a microscope. A representative example of a microscope system 30 suitable for the present embodiments is illustrated in FIG. 7. Microscope 30 system comprises system 10 as further detailed hereinabove, and a tube lens 32 behind the focal plane 14 (not shown, see FIG. 6) of system 10. Light 34 from an object of interest 36, such as, but not limited to, a biological sample, is collected by system 10. For example, light 34 can be a chemiluminescence or a fluorescence emission from object 34, or light from an external light source (not shown) that is transmitted through or reflected off object 34. By means of the optical mask, system 10 introduces optical aberrations, producing aberrated light 38, which is imaged by tube lens 32. Tube lens 32 focuses light 38 onto its image plane. In some embodiments of the present invention microscope system 30 comprises an imager 40 that is positioned at the image plane of tube lens 32 and to the focused light from tube lens 32, and generate an image signal carrying the information encoded in light 38.

In some embodiments of the present invention microscope system 30 is devoid of an active optical mask at its Fourier plane, and in some embodiments of the present invention microscope system 30 is devoid of any optical mask aside for the optical mask 12 at objective lens system 10.

Representative examples of optical characteristics of microscope system 30 include, without limitation, a depth of field of at least 4 μm for NA of about 1.49 oil immersion objective, or depth of field of at least 6 μm for NA of about 1.35 silicon oil objective, or depth of field of at least 20 μm for NA of about 0.75 air objective, or depth of field of at least 50 μm for NA of about 0.3 air objective. These embodiments are useful particularly, but not exclusively, when the optical mask 12 at objective lens system 10 extends a characteristic depth of field of objective lens arrangement 16.

Objective lens system 10 of microscope system 30 can be replaceable, or its optical mask 12 can be replaceable, for example, by means of mask holder 22. In a typical use of microscope system 30 according to these embodiments, an objective lens system or an optical mask is selected from a kit of objective lens systems or optical masks. The selection is preferably based on the type of imaging that is to be employed according to one or more properties of object 36. The selected objective lens system is mounted on microscope system 30. When kit of is a kit of optical masks, the optical mask is mounted on the objective lens system (preferably my means of holder 22) before mounting the objective lens system on microscope system 30. The object 36 is then imaged the using imager 40, and the image data received from imager 40 is processed to provide an image of the object 36.

Figure 8:
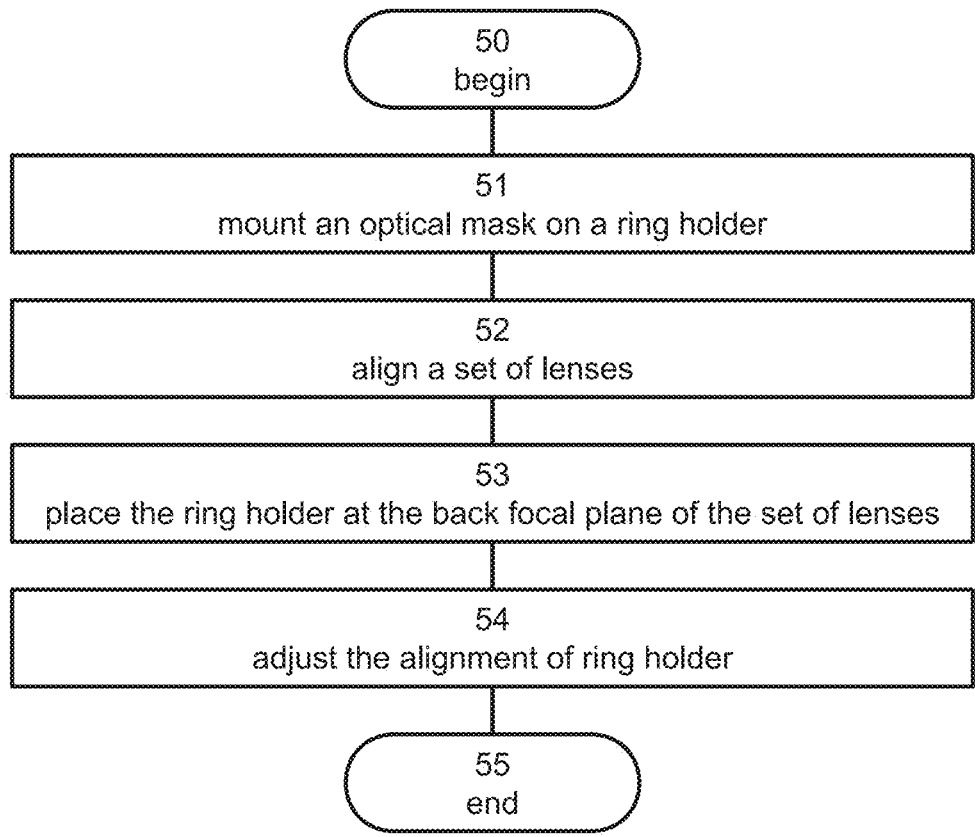
FIG. 8 is a flowchart diagram of a method suitable for fabricating an objective lens system, according to some embodiments of the present invention.

Reference is now made to FIG. 8 which is a flowchart diagram of a method suitable for fabricating an objective lens system, according to some embodiments of the present invention.

It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method begins at 50 and optionally and preferably continues to 51 at which an optical mask, e.g., mask 12 is mounted on a ring holder, e.g., holder 22. Alternatively, the optical mask can already be mounted on a ring holder, in which case operation 51 can be skipped. In some embodiments of the present invention the method proceeds to 52 at which a set of lenses, e.g., the set of lenses forming arrangement 16, is aligned along a common optical axis. The method proceeds to 53 at which the ring holder is placed at a back focal plane of the set of lenses, and to 54 at which the alignment of ring holder is adjusted so as to ensure that an optical axis of the optical mask is collinear with the common optical axis of set of lenses. Such an alignment can be by far field imaging and/or by applying point-source imaging to directly measure a characteristic PSF of the objective lens system.

The method ends at 55.

Figure 9A:
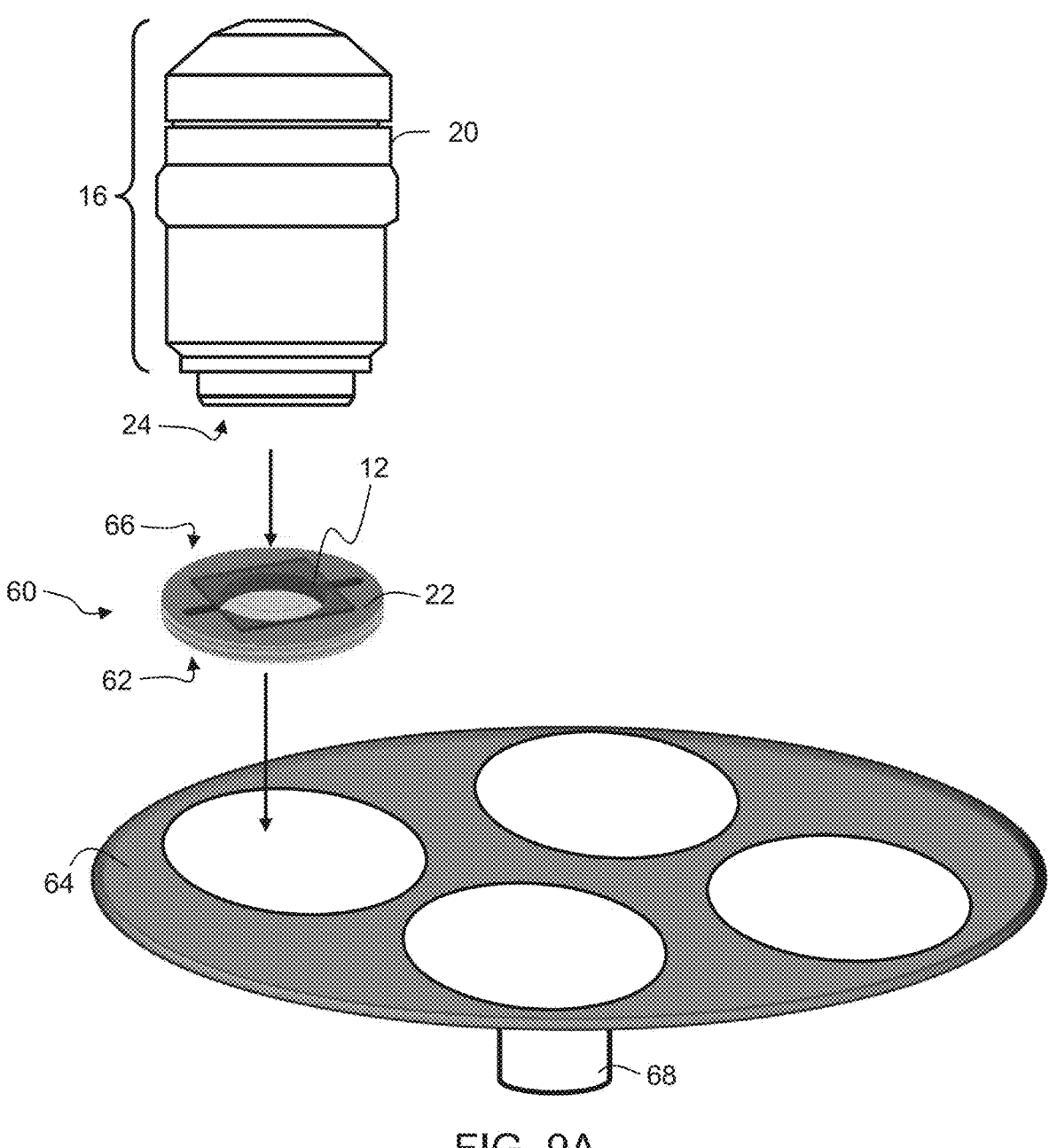
FIGS. 9A and 9B are schematic illustrations showing a configuration in which a ring holder is at the back side of a housing of an objective lens arrangement, according to some embodiments of the present invention.

The present embodiments also contemplate configurations in which ring holder 22 is mounted on the back side of the housing 20 of the objective lens arrangement 16. Such a configuration is illustrated in FIG. 9A, showing an optical mask system 60, wherein the optical mask system 60 comprises ring holder 22 and optical mask 12 mounted on ring holder 22. In the illustrated embodiment, ring holder 22 is removably connectable to a turret 64 of a microscope (not shown), in a manner that manner that allows turret 64 to also receive, on top of the ring holder 22, housing 20 containing the set of lenses of arrangement 16. FIG. 9A is an exploded view of the configuration, showing the optical mask system 60, the hosing 20 and the turret 64 in their disconnected state.

Optionally, but not necessarily, the set of lenses of objective lens in arrangement 16 are arranged such that when front side 66 is connected to housing 20, optical mask 12 is at the back focal plane of objective lens arrangement 16. The connection between turret 64 and each of optical mask system 60 and housing 20 can be of any type known in the art, such screw-on connection, snap-on connection, push-pull connection and the like.

Figure 9B:
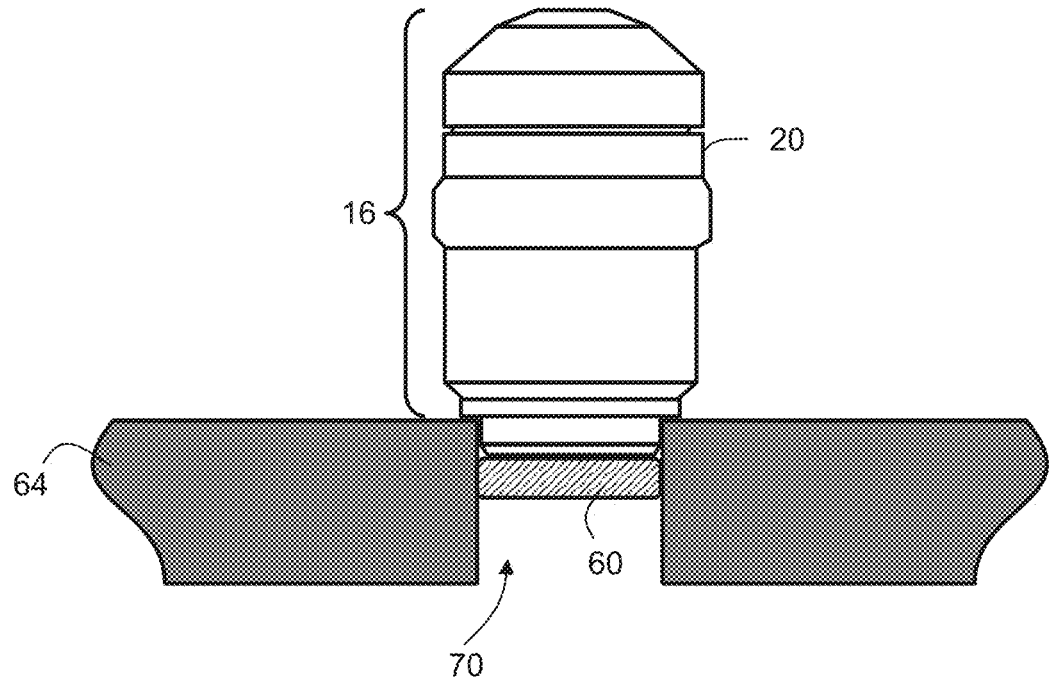

It is not necessary for housing 20 to be connected to optical mask system 60. Housing 20 can contact optical mask system 60, or be in close proximity thereto, without connecting them. With reference to FIG. 9B, in a preferred configuration, optical mask system 60 is inserted into a recess or through hole 70 of turret 64, wherein the depth of recess or through hole 70 is larger than the overall height of optical mask system 60. Optical mask system 60 is inserted into recess or through hole 70 in a manner that leaves a space within the recess or through hole 70 above optical mask system 60 to receive also housing 20. For example, a recess or through hole 70 of turret 64, can be formed with a female thread and both ring holder 22 and housing 20 can be formed with male threads that match the female thread of recess or through hole 70. Optical mask system 60 can then be screwed in before housing 20 ensuring that mask system 60 is at the back side 24 (see FIG. 9A) of housing 20 within recess or through hole 70.

Alternatively, ring holder 22 can have a backside 62 that is removably connectable to turret 64, and a front side 66 that is removably connectable to housing 20. In these embodiments also, housing 20 is removably connectable directly to turret 64, to allow imaging through the objective lens arrangement 16 without mask 12. The connection between optical mask system 60 and each of housing 20 and turret 64 can be of any type known in the art, such screw-on connection, snap-on connection, push-pull connection and the like.

In some embodiments of the present invention one or more optical mask systems and one or objective lens arrangement are provided as a kit, wherein each optical mask system has a different optical mask, but has a ring holder 22 that is removably connectable to turret 64. In some embodiments of the present invention, turret 64 is rotatably mounted to a support member 68 for retaining a plurality of optical mask systems like system 60 and/or a plurality of objective lens arrangements, like arrangement 16. This allows selecting one of the optical mask systems and/or objective lens arrangements by rotation of the turret.

As used herein the term "about" refers to ±10%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

An Objective Lens with Application-Optimized Wavefront Modulation

This Example describes a microscope objective modified by placing an optical mask (e.g., a phase mask, an amplitude mask, or a phase-amplitude mask) in the back focal plane. The mask can be engineered to extend the depth of field or encode the position an/or orientation and/or wavelength of emitters in a large axial depth. The mask is optionally and preferably placed in an aperture stop at the back focal plane to ensure spatially invariant PSF over the entire Field Of View (FOV). The alignment of the mask can be adjusted by far field imaging, or directly on the microscope using fiduciary particles. This allows customizing standard objectives with various wavefront modulations, specifically designed for the imaged content.

The precise and accurate localization of various biomolecules is crucial for studying the structure and dynamics of sub-cellular processes. For example, in superresolution experiments, emitters are localized separately in sparse conditions, resulting in 2D or 3D point clouds with a resolution far exceeding the diffraction limit. In the specific case of imaging under stochastic optical reconstruction microscopy (STORM) blinking conditions, super-resolved reconstructions of cellular organelles can be generated, providing valuable information about their structure and function. Some applications require further estimation of the molecular properties of the emitters, such as orientation and wavelength. Typically, microscopes are designed and optimized for aberration-free diffraction limited imaging, forming sharp in-focus Airy patterns inside a shallow depth of field. Commonly, the imaging is done under low light conditions, thus under slight defocus, the Airy pattern PSF rapidly disappears under the noise threshold. As a result, acquiring 3D information is usually achieved by scanning in the axial direction or by modifying the optical path with elements that modulate the PSF, such as phase or amplitude masks. Additionally, various biological samples and optical components can induce aberrations on the imaging path, requiring correction by similar PSF modulating techniques. These PSF modulations often necessitate extensive modifications to the microscope imaging path, resulting in expensive and sub-optimal systems.

Typical optical microscopy experiments can be performed by cither directly imaging cells or by labeling target molecules with fluorescent emitters, such as quantum dots or fluorescent proteins. Various PSF modulating techniques add 4f optical processing systems to a conventional microscope, such that their back focal plane is conjugate to the objective lens' aperture. These systems contain at least two long focal length lenses and a phase/amplitude mask, realized by a Liquid Crystal Device (LCD), a deformable mirror, a Dielectric Optical Element (DOE) or a meta-material lens. The mentioned techniques modify the PSF of the imaging system to encode the desired information about the emitter, correct for optical aberrations, or extend the depth of field.

All mentioned methods are based on imaging and digitally processing the measured irradiance patterns. Then, based on the imaging application, the optimal phase/amplitude mask is designed. The optimization step is usually comprised of iteratively altering the digital model to either encode position and/or wavelength and/or orientation information, or match the measured patterns via Phase Retrieval (PR) methods. The optimization is typically by minimizing a cost function with respect to altering the optical mask in the imaging model.

This Example describes a simplified implementation of PSF engineering techniques in optical microscopy, according to some embodiments of the present invention. The technique of the present embodiments removes the need to extend the microscope's optical path, by implementing the PSF modulation into the objective's aperture directly. The present embodiments provide manual or automated axial alignment of a designed phase/amplitude mask into the aperture of the microscope. In many objectives, the aperture is confined in the objective body. In these cases, a matching holder for the mask is optionally and preferably used. For a confocal illumination setup, the modification described herein can also change the excitation PSF, while widefield imaging is effected only in the emission path.

This Example describes a method and a system that may be used to design, fabricate and align a microscope modification, as illustrated in FIG. 3, where different optical masks are added to a single objective. This Example describes a design and a fabrication of a custom holder for the optical mask, as illustrated in FIG. 1, a method to align it with the objective lens' aperture and integration with a standard optical microscope. This Example describes a method to design an orientation encoding pattern or Extended Depth Of Field (EDOF) imaging to a microscope objective. Fluorescent emitters create a dipole emission pattern in applications where the rotational mobility is constrained. In such cases, the molecular orientation hold information about the local conformation of the target structure. This Example describes a design procedure to create an optical mask which encodes this information for improved (optionally and preferably optimal) position and orientation recovery. The EDOF PSF is optionally and preferably designed by changing the axial rate of divergence of the PSF, results presented in FIG. 5 and FIG. 2. The PSF can be digitally altered to create a slower rate of divergence, compared to the standard Airy pattern of an ideal microscope. Once the optical mask is designed, such a mask may be fabricated by various techniques including, but are not limited to, photolithograpy, and 3D printing by two-photon polymerization.

Imaging Model

The irradiance model for the system of this Example is based on the diffraction pattern from fluorescent emitters with an emission wavelength $\lambda$ suspended in imaging medium, usually water, (refractive index of $n_2$) above an objective (immersion refractive index of $n_1$, can be oil or air).

By basing the irradiance model on fluorescent emitters, the Inventors ensure that the imaging model is incoherent. While the embodiments described in this Example are described with a particular emphasis to an incoherent imaging model, it is to be understood that some embodiments of the present invention contemplate a coherent imaging model.

The emitters are imaged with an objective lens (numerical aperture of NA), focused at a focus plane f, and their image is magnified onto the sensor with a microscope magnification M. Let $\Psi$ denote the optical mask placed in the aperture of the microscope and let $(p, \phi)$ denote the normalized radial coordinates in the Fourier plane such that $p=1$ at $$\frac{NA}{n_1}.$$

Under the scalar $n_1$ approximation, the PSF of a point source located at $(x_0, y_0, z_0)$ above a waterglass interface is given by $$PSF(\xi, \eta; \Psi, x_0, y_0, z_0) \propto \left| \mathcal{F}\left( \mathcal{A}(\rho, \phi) e^{j\mathcal{M}(\rho,\phi) + \frac{2\pi j}{\lambda} \phi(\rho,\phi; x_0, y_0, z_0, f)} \right) \right|^2, \quad (1)$$

where $(\xi, \eta)$ are the coordinates at the image plane, $\mathcal{F}$ is the two-dimensional Fourier transform, $\mathcal{A}(\rho, \phi)$ is the effective aperture, limited by $n_2$ for high NA objectives and by the NA for air immersed objectives $$\mathcal{A}(\rho, \phi) = \begin{cases} 1, & \text{if } \rho \le \min\left(\frac{n_2}{n_1}, 1\right), \\ 0, & \text{otherwise} \end{cases} \quad (2)$$

and $(\rho, \phi; x_0, y_0, z_0, f)$ is the accumulated phase due to the emitter 3D position and the focal plane setting. This phase can be decomposed into lateral and axial components $$\Phi(\rho, \phi; x_0, y_0, z_0, f) = \Phi_{xy}(\rho, \phi; x_0, y_0) + \Phi_z(\rho, \phi; z_0, f). \quad (3)$$

The lateral component is assumed in this Example to be a linear phase (i.e., shift-invariant convolution system), given by $$\Phi_{xy}(\rho, \phi; x_0, y_0) = \frac{M \cdot NA}{\sqrt{M^2 - NA^2}}(x_0 \rho \cos \phi + y_0 \rho \sin \phi). \quad (4)$$

The axial component is split into two terms to account for refractive index-mismatch: the phase accumulated in the imaging medium due to the emitter depth $z_0$, and the phase accumulated in the immersion medium due to a focus shift $f$ from the coverslip $$\Phi_z(\rho, \phi; z_0, f) = \Phi_{n_1}(\rho, \phi; f) + \Phi_{n_2}(\rho, \phi; z_0), \quad (5)$$

where, $$\Phi_{n_1}(\rho, \phi; f) = -f n_1 \sqrt{1 - \rho^2}, \quad (6)$$

$$\Phi_{n_2}(\rho, \phi; z_0) = z_0 n_2 \sqrt{1 - \left(\frac{n_1}{n_2}\rho\right)^2}. \quad$$

The PSF is optionally and preferably slightly smoothed in image space $$PSF(\xi, \eta; \Psi, x_0, y_0, z_0) \circledast \mathcal{G}(\xi, \eta), \quad (7)$$

where $\circledast$ denote convolution, and $\mathcal{G}(\xi, \eta)$ is a 2D Gaussian kernel, with a standard deviation that is fit empirically to match experimental data. This blur accounts for the finite size of the emitter, its spectrum, and the inherent blur in the optical system. The image $V(\xi, \eta)$ of a set of fluorescent emitters $\cup_i r_i$ is given by the incoherent sum of their PSFs $$V\left(\xi, \eta; \Psi, \bigcup_i, r_i\right) = \sum_i PSF(\xi, \eta; \Psi, r_i), \quad (8)$$

where $r_i = (x_i, y_i, z_i)$ is the 3D position of the ith emitter. The measurement model is given by a data-dependent Poisson noise $\mathcal{D}(\xi, \eta)$, and an additive Gaussian read noise $\mathcal{R}(\xi, \eta)$ $$\begin{aligned} \mathcal{J}(\xi, \eta) &= \mathcal{D}(\xi, \eta) + \mathcal{R}(\xi, \eta), \quad (9) \\ \mathcal{D}(\xi, \eta) &\sim \mathcal{P}(V(\xi, \eta) + \mathcal{B}(\xi, \eta)), \\ \mathcal{R}(\xi, \eta) &\sim \mathcal{N}(\mu, \sigma^2), \end{aligned}$$

where $\mathcal{P}$ is the Poisson distribution, $\mathcal{B}(\xi, \eta)$ is a per-pixel background noise, $\mathcal{N}$ is the normal distribution, $\mu$ is a baseline count level, and $\sigma^2$ is the read-noise variance. To make the measurement model differentiable, by the law of large numbers, the Poisson noise $\mathcal{D}(\xi, \eta)$ can be approximated with a Gaussian noise $\mathcal{D}_{\mathcal{N}}(\xi, \eta)$ using the central limit theorem $$\begin{aligned} \mathcal{D}(\xi, \eta) &\approx \mathcal{D}_N(\xi, \eta), \quad (10) \\ \mathcal{D}_N(\xi, \eta) &\sim \mathcal{N}(V(\xi, \eta) + \mathcal{B}(\xi, \eta), V(\xi, \eta) + \mathcal{B}(\xi, \eta)). \end{aligned}$$

EDOF PSF Design

To design a PSF which extends the effective depth of field, a PR technique is optionally and preferably adapted to create a non-changing PSF over a large axial range.

The digital imaging model is used to simulate the in-focus Airy disk PSF for the desired microscope. Afterwards, this PSF is thresholded to keep only the main lobe with diameter D, and the result is fitted with a 2D Gaussian $\mathcal{A}(\xi, \eta)$. This Gaussian is then replicated to generate a synthetic z-stack over the desired range. $\mathcal{A}(\xi, \eta)$ is also used to define a weighting matrix $\mathcal{S}(\xi, \eta)$, that compresses signal photons into the diffraction limited spot, D. Let $(\xi, \eta)$ be centered pixel coordinates in image space, the matrix $\mathcal{S}(\xi, \eta)$ is given by $$\mathcal{S}(\xi, \eta) = \begin{cases} 1, & \text{if } \sqrt{\xi^2 + \eta^2} \le D \\ \alpha \cdot \sqrt{\xi^2 + \eta^2}, & \text{otherwise} \end{cases}, \quad (11)$$

where in the present Example $\alpha$ and D are determined by the spatial extent of the diffraction limited spot.

Given $\mathcal{S}(\xi, \eta)$, the corresponding optical mask associated with the synthetic z-stack is retrieved via phase retrieval. This can be implemented using Stochastic Gradient Descent (SGD) with importance sampling to minimize a cost function comprised of two parts:

$$\mathcal{L}_{EDOF}(\Psi) = \mathcal{L}_{Airy}(\Psi) + \beta \cdot L_{TV(z)}(\Psi). \quad (12)$$

The parameter $\beta$ can empirically chosen to balance the two terms.

The first term in the cost function is aimed at making the PSF pattern resemble the unmodulated in-focus PSF across the entire depth range, given by $$\mathcal{L}_{Airy}(\Psi) = \sum_{i=1}^{N_z} \| (PSF(\xi, \eta; \Psi, z_i) - \mathcal{A}(\xi, \eta)) \cdot S(\xi, \eta) \|_2^2. \tag{13}$$

where $PSF(\xi, \eta; \Psi, z_i)$ is the on-axis PSF at depth $z_i$, and $N_z$ is the number of axial slices.

The second term in the cost function is a Total Variation (TV) loss in the axial direction, pushing the PSF towards a smooth and non changing PSF (by minimizing the axial gradient in image space), $$\mathcal{L}_{TV(z)}(\Psi) = \sum_{i=1}^{N_z-1} \| (PSF(\xi, \eta; \Psi, z_{i+1}) - PSF(\xi, \eta; \Psi, z_i)) \|_1. \tag{14}$$

The EDOF design is advantageous because its lateral extent is close to the diffraction limit. The EDOF design is also advantageous because the SNR in the main spot is preserved above the noise limit of a typical experiment. The EDOF design is also advantageous because the optical mask is smooth, resulting in relaxed fabrication constraints.

Figures 4A, 4B, 4C, 4D, 5A, 5B, 5C, 5D, 5E:
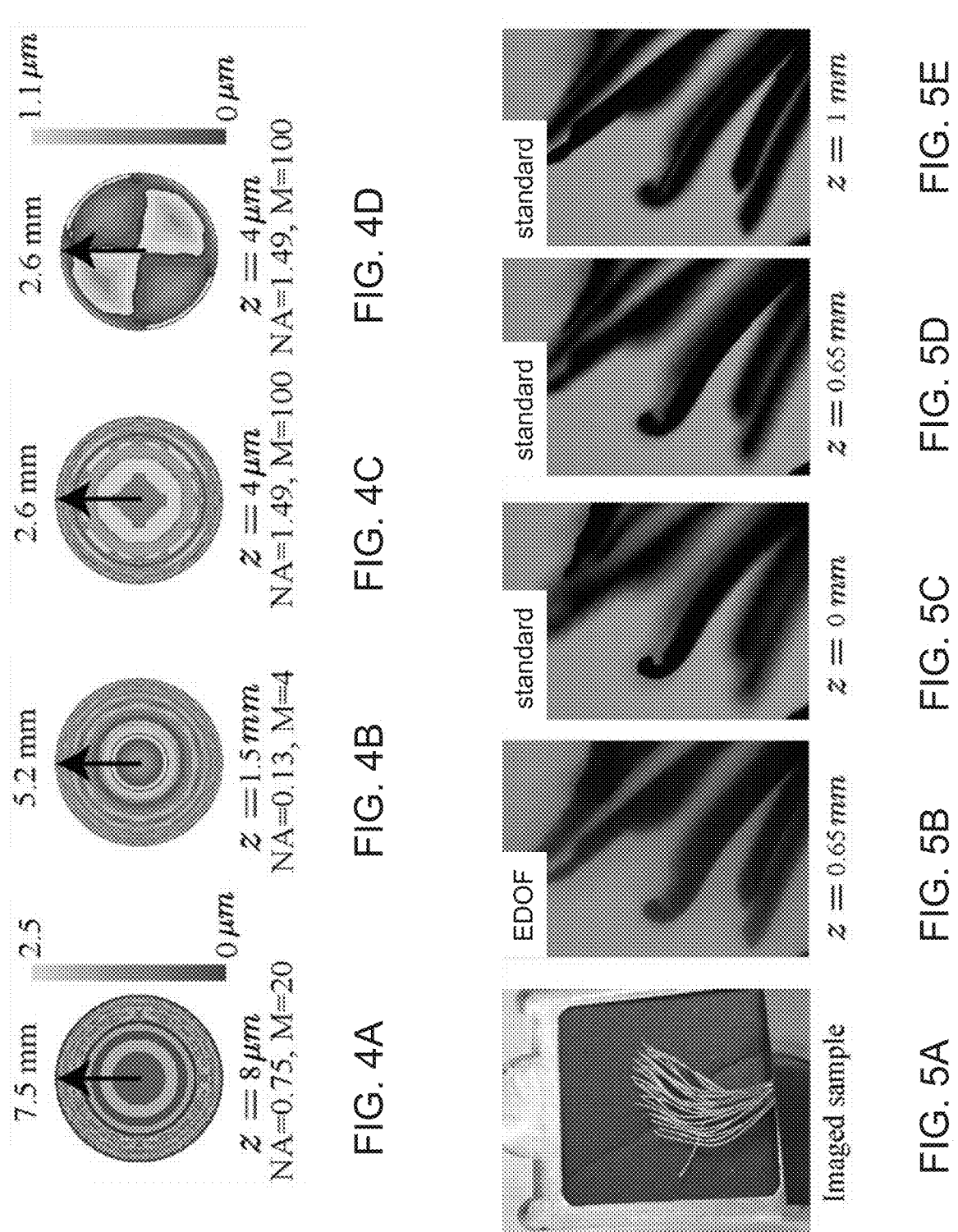
FIGS. 4A-D show examples of various quartz phase mask designs according to some embodiments of the present invention. Each mask is optimized for a different depth range, z, based on the objective lens and the application.
FIGS. 5A-E show results of experimental axial stack measurements of electrical wires, obtained in experiments performed according to some embodiments of the present invention.

An XZ cross section and line plots of an EDOF design for high NA objective are provided in FIG. 2. The procedure described in this Example can produce EDOF optical masks matching different objectives and diameters, as shown in FIG. 4.

Cramer Rao Lower Bound Optimization

The Cramer Rao Lower Bound (CRLB) of the system is optionally and preferably used to derive the 3D depth encoding optical masks. For this optimization, the measurement model is reduced to a Poisson data-dependent noise.

Let $P_\theta(\xi, \eta; \Psi) \equiv PSF(\xi, \eta; \Psi; \theta)$ denote the model PSF of an emitter located at $0 = (x_0, y_0, z_0)$, imaged in a detection path with phase modulation $\Psi$. Assuming Poisson statistics for the source and background signals, the measured image $\mathcal{J}(\xi, \eta)$ is given by $$\mathcal{J}(\xi, \eta) \sim \mathcal{P}\ (P_\theta(\xi, \eta; \Psi) + \mathcal{B}\ (\xi, \eta)), \tag{15}$$

where P is the Poisson distribution, and $\mathcal{B}\ (\xi, \eta)$ is a per-pixel background noise. The log-likelihood function $\ell\ (\theta; \mathcal{M}\ )$ for the measurement in eq. (15) is given by $$\ell\ (\theta; \Psi) = \sum_{\xi, \eta} \mathcal{J}(\xi, \eta) \cdot \log(P_\theta(\xi, \eta; \Psi)) - P_\theta\ (\xi, \eta; \Psi) + C\ (\mathcal{J}(\xi, \eta)), \tag{16}$$

where $C(\ \mathcal{J}(\xi, \eta))$ is a function of the measurements that is independent of the unknown 3D position $\theta$ and is usually discarded. Given a log-likelihood function, the Fisher Information matrix $\mathcal{Q}(\theta; \Psi)$ is defined as $$[Q\ (\theta; \Psi)]_{i,j} = E \left[ \frac{\partial}{\partial \theta_i} \ell\ (\theta; \Psi) \cdot \frac{\partial}{\partial \theta_j} \ell\ (\theta; \Psi) \,\middle|\, \theta \right] \tag{17}$$

The log-likelihood derived in EQ. (16) is substituted into EQ. (17) to provide $$[Q\ (\theta; \Psi)]_{i,j} = \sum_{\xi, \eta} \frac{\partial}{\partial \theta_i} P_\theta(\xi, \eta; \Psi) \cdot \frac{\partial}{\partial \theta_j} P_\theta(\xi, \eta; \Psi) \cdot \frac{1}{P_\theta(\xi, \eta; \Psi) + \mathcal{B}\ (\xi, \eta)}. \tag{18}$$

Given $\mathcal{Q}(\theta; \Psi)$, the CRLB for estimating $\theta_i$ is defined as $$CRLB_i\ (\theta; \mathcal{M}) = \left[ Q\ (\theta; \Psi)^{-1} \right]_{i,i}. \tag{19}$$

Based on the CRLB derivation, the optical mask Y' is optimized for all three estimated parameters $\hat{\theta} = (\hat{x}_0, \hat{y}_0, \hat{z}_0)$ by minimizing the following cost function $$\mathcal{L}_{CRLB}(\Psi) = \sum_{i \in \{\hat{x}_0, \hat{y}_0, \hat{z}_0\}} \sum_{\theta'} \sqrt{CRLB_i(\theta'; \Psi)}. \tag{20}$$

In the present Example, $CRLB_i(\theta'; \Psi)$ is evaluated at on-axis positions $\theta' = (0, 0, z')$, where z' is sampled each $\Delta_z$ throughout the desired axial range. The PSFs are scaled to match realistic signal counts encountered in standard single molecule experiments. Unlike conventional methods, the CRLB is optionally and preferably optimized using a per-pixel approach to efficiently navigate the wide variety of possible solutions.

Orientation Encoding

In some applications, fluorescent emitters do not have full rotational mobility, even at room temperature. This can occur when the emitter is rigidly bounded to the target molecule, for example intercalator (e.g. Sytox Orange) molecules connected to DNA. These conditions create a dipole emission pattern which is dependent on the molecular orientation and does not match the imaging model provided in EQs. 1-10. Furthermore, the orientation can hold viable information about the local structure. It is appreciated that in this case is that the parameter space is larger, as 4 new variables can affect the image formation: the orientation vector ($\mu_x$, $\mu_y$, $\mu_z$) and the rotational mobility $\gamma$.

According to some embodiments of the present invention an end-to-end machine learning procedure (e.g., a neural-network) is employed for designing an optical mask that encodes orientation and position information.

The machine learning procedure can be trained to esti-mate the orientation and position parameters of the emitter from a theoretical model, and updates the optical mask simultaneously, for example, via backpropagation. To facili-tate such an approach, a vectorial imaging model is option-ally and preferably used. After convergence, the designed optical mask can be implemented into the objective in the exact same way as the previously described masks, and the trained algorithm can be readily deployed to analyze any measured data.

Preferred Recovery Procedures

A procedure that analyzes a snapshot with many emitters typically involves sequentially fitting each detected PSF. The position recovery for a single emitter is optionally and preferably performed by matching the digital imaging model (usually after PR for aberration correction) with the small cropped experimental region. The fitting procedure can be realized by minimizing a cost function that penalizes the discrepancy between the model and the image. This can be done using Maximum Likelihood Estimation based on the statistical imaging model, for example, according to EQ. (16).

Alternatively, deep-learning techniques can be deployed. In these embodiments, a machine learning procedure (e.g., a neural-network) is trained on simulated data. At inference time, the weights of the machine learning procedure are fixed, and an experimental frame is entirely fit to recover an occupancy grid (a 2D/3D volume of probabilities to find an emitter in each pixel/voxel). Afterwards, post-processing is optionally and preferably applied and a threshold is applied to create a binary localization grid which is then reduced to compile a list of 2D/3D emitter positions. Deep-learning techniques have a significant inference time advantage, can handle denser regions and can be made robust to challenging experimental conditions.

Device Fabrication and Alignment

Placement of the optical mask in the objective aperture can be done during the assembling of the set of lenses of the objective, or it can be added to an existing objective by fabricating an adjustable ring holder, as illustrated in FIG. 1.

Depending on the objective body, the ring optionally and preferably contains a threading or spacers for accurate axial positioning. The holder can be fabricated, for example, by 3D printing. Preferably, the outer dimensions of the holder are the same or approximately the same as the objective housing, and the inner radius of the holder matches the desired numerical aperture. The holder can have a sag to fully contain the mask without it exceeding the dimensions of the holder. The mask can be glued to the holder using optical adhesion, or be placed in an etched groove such that optical masks can be replaced, if desired.

In some embodiments of the present invention the phase mask is placed on a ring and an objective is fabricated with a modulated slot in its back focal plane. This facilitates a simple way for changing between different masks, designed for different implementations, without the need to replace or open the objective. The ring can be made of, e.g., metal. The ring can be fixed at the objective's slot, for example, by using magnets or by mortises and tenons. Also contemplated are embodiments in which an empty ring is fabricated. Such a ring can be used when it is desired not to modify the PSF of the objective, for example, for the purpose of generating a human-interpretable image.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. An objective lens system, comprising:
a set of lenses, arranged along a common optical axis to form a back focal plane;
an optical mask at said back focal plane, said optical mask being selected to extend a characteristic depth of field (DOF) of said set of lenses; and
a housing encapsulating said set of lenses and said optical mask;
wherein the objective lens system is a component in a microscope and is characterized by a depth of field of at least 4 $\mu$m for NA of about 1.49 oil immersion objective, or at least 6 $\mu$m for NA of about 1.35 silicon oil objective, or at least 20 $\mu$m for NA of about 0.75 air objective, or at least 50 $\mu$m for NA of about 0.3 air objective.

2. The system according to claim 1, wherein said optical mask is selected to encode depth information in an optical beam received from an object.

3. The system according to claim 1, wherein said optical mask is selected to encode spectral information in an optical beam received from an object.

4. The system according to claim 1, wherein said optical mask is selected to encode orientation information in an optical beam received from an object.

5. The system according to claim 1, wherein said optical mask is selected to introduce optical aberrations to an optical beam passing therethrough.

6. The system according to claim 1, wherein said optical mask is a phase mask.

7. The system according to claim 1, wherein said optical mask is an amplitude mask.

8. The system according to claim 1, wherein said optical mask is a phase-amplitude mask.

9. The system according to claim 1, comprising a removable ring holder, wherein said optical mask is mounted on said removable ring holder.

10. The system according to claim 1, characterized by a numerical aperture of at least 0.1.

11. The system according to claim 1, having a total length of less than 10 cm.

12. A kit, comprising a plurality of objective lens systems, wherein each objective lens system comprises the system according to claim 1, and wherein at least two of said objective lens system have different optical masks.

13. A method of imaging an object, the method comprising:
selecting from the kit of claim 12 an objective lens system, based on at least one property of the object;
mounting said selected objective lens system on a microscope having an imaging system;
imaging the object using said imaging system; and
processing image data received from said imaging system to provide an image of the object.

14. The method according to claim 13, wherein said microscope is devoid of an active optical mask at a Fourier plane thereof.

15. The method according to claim 13, wherein said microscope is devoid of any optical mask aside for said optical mask at said objective lens system.

16. A microscope system, comprising an objective lens system, a tube lens system, and an imaging system, wherein said objective lens system comprises the system according to claim 1.

17. A method of fabricating the objective lens system of claim 1, the method comprising:

mounting said optical mask on a ring holder;

placing said ring holder at a back focal plane of said set of lenses arranged along said common optical axis; and adjusting alignment of said ring holder to ensure that an optical axis of said optical mask is collinear with said common optical axis of said set of lenses.

18. An optical mask system, comprising a ring holder and an optical mask mounted on said ring holder, said ring holder being removably connectable to a turret of a microscope in a manner that allows said turret to also receive, on top of said ring holder, the objective lens system of claim 1.

* * * * *